United States Patent
Leininger

(10) Patent No.: US 9,926,939 B2
(45) Date of Patent: *Mar. 27, 2018

(54) SYSTEM FOR DRAWING SOLID FEED INTO AND/OR OUT OF A SOLID FEED PUMP

(71) Applicant: General Electric Company, Schenectady, NY (US)

(72) Inventor: Thomas Frederick Leininger, Chino Hills, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 456 days.

This patent is subject to a terminal disclaimer.

(21) Appl. No.: 14/673,412

(22) Filed: Mar. 30, 2015

(65) Prior Publication Data

US 2015/0204343 A1 Jul. 23, 2015

Related U.S. Application Data

(63) Continuation of application No. 13/431,903, filed on Mar. 27, 2012, now Pat. No. 9,022,723.

(51) Int. Cl.
*F04D 29/22* (2006.01)
*F04D 29/66* (2006.01)
*F04D 29/44* (2006.01)
*G01F 13/00* (2006.01)

(52) U.S. Cl.
CPC ............ *F04D 29/22* (2013.01); *F04D 29/44* (2013.01); *F04D 29/66* (2013.01); *G01F 13/001* (2013.01)

(58) Field of Classification Search
CPC ..... F04D 7/00; F04D 7/02; F04D 7/04; F04D 7/045; F04D 23/001; F04D 23/003; F04D 23/005; F04D 23/008; F04D 29/22; F04D 29/44; F04D 29/66; G01F 13/001
USPC ........................ 415/62, 88, 121.1, 121.2, 127
See application file for complete search history.

(56) References Cited

U.S. PATENT DOCUMENTS

| | | | |
|---|---|---|---|
| 3,519,365 A | 7/1970 | Conhagen | |
| 4,143,999 A | 3/1979 | Ryall | |
| 4,449,888 A * | 5/1984 | Balje | ..................... F04D 13/12 415/143 |
| 4,516,674 A | 5/1985 | Firth | |
| 4,830,584 A | 5/1989 | Mohn | |
| 4,900,222 A | 2/1990 | Meng et al. | |
| 4,988,239 A | 1/1991 | Firth | |

(Continued)

FOREIGN PATENT DOCUMENTS

| CN | 1125427 A | 6/1996 |
|---|---|---|
| CN | 1646813 A | 7/2005 |

OTHER PUBLICATIONS

U.S. Non-Final Office Action issued in connection with corresponding U.S. Appl. No. 13/431,903 dated Oct. 8, 2014.

(Continued)

*Primary Examiner* — Jason Shanske
*Assistant Examiner* — Alexander White
(74) *Attorney, Agent, or Firm* — Fletcher Yoder P.C.

(57) ABSTRACT

A system includes a solid feed pump. The solid feed pump includes a housing, a rotor disposed in the housing, a curved passage disposed between the rotor and the housing, a solid feed inlet coupled to the curved passage, a solid feed outlet coupled to the curved passage, and a rotatable sleeve configured to rotate to actively draw solid feed into the solid feed inlet or out of the solid feed outlet.

18 Claims, 4 Drawing Sheets

(56) References Cited

U.S. PATENT DOCUMENTS

| | | |
|---|---|---|
| 5,051,041 A | 9/1991 | Firth |
| 5,355,993 A | 10/1994 | Hay |
| 5,381,886 A | 1/1995 | Hay |
| 5,402,876 A * | 4/1995 | Hay .................. F04D 5/001 198/638 |
| 5,485,909 A * | 1/1996 | Hay .................. F04D 5/001 198/642 |
| 5,497,873 A | 3/1996 | Hay |
| 5,551,553 A | 9/1996 | Hay |
| 5,657,704 A | 8/1997 | Schueler |
| 5,885,065 A | 3/1999 | Long |
| 5,955,637 A | 9/1999 | Furmanek et al. |
| 6,213,289 B1 | 4/2001 | Hay et al. |
| 6,832,887 B2 | 12/2004 | Baer et al. |
| 6,955,637 B1 * | 10/2005 | Montano .................. B04B 1/00 494/41 |
| 8,011,861 B2 | 9/2011 | Sprouse et al. |
| 8,152,443 B1 | 4/2012 | Pemberton |
| 2009/0178336 A1 | 7/2009 | Van Der Ploeg |
| 2011/0027076 A1 * | 2/2011 | Alison-Youel ........ F04D 29/181 415/185 |
| 2011/0139583 A1 | 6/2011 | Bielenberg et al. |
| 2011/0253510 A1 | 10/2011 | Fang et al. |
| 2011/0255961 A1 | 10/2011 | Akundy et al. |
| 2011/0277385 A1 | 11/2011 | Mazumdar et al. |
| 2011/0318234 A1 * | 12/2011 | Dinu ...................... C10J 3/506 422/139 |
| 2011/0318254 A1 | 12/2011 | Morishita |
| 2012/0063957 A1 | 3/2012 | Depuy et al. |
| 2012/0067702 A1 | 3/2012 | Frey et al. |
| 2012/0171054 A1 | 7/2012 | Russell et al. |
| 2012/0205222 A1 | 8/2012 | Russell et al. |
| 2012/0234652 A1 | 9/2012 | Stevenson et al. |
| 2013/0081925 A1 | 4/2013 | Stevenson et al. |
| 2013/0109564 A1 | 5/2013 | Miller |
| 2013/0133222 A1 | 5/2013 | Kumar et al. |
| 2013/0240083 A1 | 9/2013 | Russell et al. |

OTHER PUBLICATIONS

Unofficial English translation of Chinese Office Action issued in connection with corresponding CN Application No. 20131010579.6 dated Jan. 12, 2016.

* cited by examiner

SYSTEM FOR DRAWING SOLID FEED INTO AND/OR OUT OF A SOLID FEED PUMP

CROSS-REFERENCE TO RELATED APPLICATIONS

This application is a continuation of U.S. patent application Ser. No. 13/431,903, entitled "SYSTEM FOR DRAWING SOLID FEED INTO AND/OR OUT OF A SOLID FEED PUMP," filed Mar. 27, 2012, which is herein incorporated by reference in its entirety.

BACKGROUND OF THE INVENTION

The subject matter disclosed herein relates to a solid feed pump, and more specifically, to a system for drawing solid feed into and/or out of a solid feed pump.

A solid feed pump is used in a variety of industries to transport solids, such as particulate matter. In general, the solid feed pump transports solids along a moving path (e.g., a rotating part) from an inlet to an outlet. The performance of the solid feed pump is at least partially dependent on the intake efficiency of the solids flowing through the inlet to the rotating part of the solid feed pump. Unfortunately, any variable intake of solids and/or voids in the solids may cause an unsteady flow rate and/or unsteady pressure of the solids being pumped by the solid feed pump.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a solid feed pump. The solid feed pump includes a housing, a rotor disposed in the housing, a curved passage disposed between the rotor and the housing, a solid feed inlet coupled to the curved passage, a solid feed outlet coupled to the curved passage, and a rotatable sleeve configured to rotate to actively draw solid feed into the solid feed inlet or out of the solid feed outlet.

In accordance with a second embodiment, a system includes a rotatable sleeve configured to couple to a solid feed inlet or a solid feed outlet of a solid feed pump and to rotate to actively draw solid feed into the solid feed inlet or out of the solid feed outlet, wherein the rotatable sleeve comprises a hollow cylinder, an inner surface, and at least one spiral ridge that extends away from the inner surface into the a flow of the solid feed.

In accordance with a third embodiment, a system includes a solid feed pump. The solid feed pump includes a housing, a rotor disposed in the housing, a solid feed passage disposed between the rotor and the housing, a solid feed inlet coupled to the solid feed passage, and a solid feed outlet coupled to the solid feed passage. The solid feed pump also includes a rotatable sleeve disposed within the solid feed inlet, wherein the rotatable sleeve is configured to rotate to actively draw solid feed into the solid feed inlet. The solid feed pump further includes a vibrator spool piece coupled to an upstream end of the solid feed inlet, wherein the vibrator spool piece includes a vibrator centrally located within the vibrator spool piece. The vibrator extends into an opening of the rotatable sleeve in a direction of the solid feed flow, and the vibrator is configured to actively conduct solid feed into the solid feed inlet.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
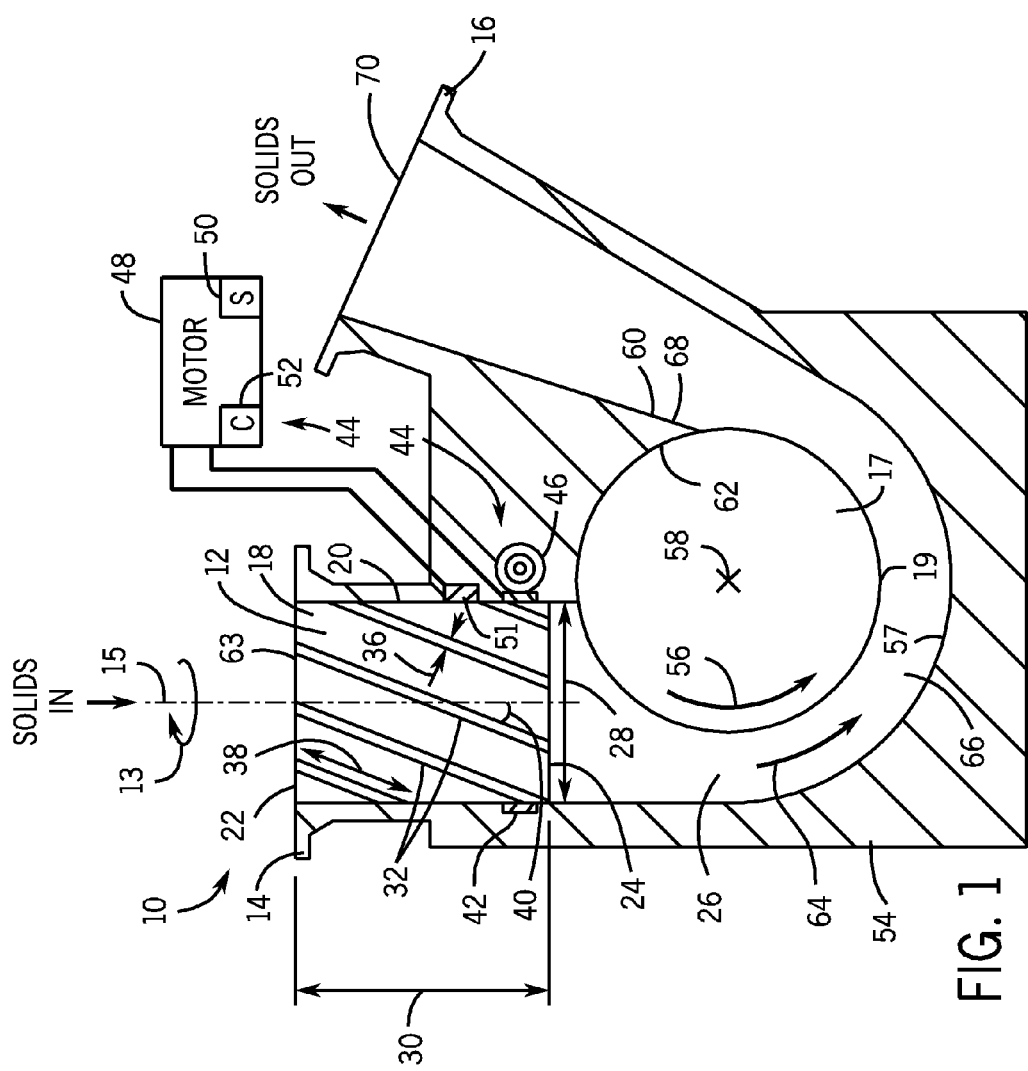
FIG. 1 is a schematic cross-sectional view of an embodiment of a solid feed pump having a rotatable sleeve disposed within a solid feed inlet.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include systems for maintaining a desired pressure level and flow rate of solids into and/or out of a solid feed pump. In particular, the solid feed pump includes a rotatable sleeve configured to rotate to actively draw solid feed into a solid feed inlet or out of a solid feed outlet of the pump. The rotatable sleeve may be disposed within the solid feed inlet and/or the solid feed outlet. The rotatable sleeve is a hollow cylinder with at least one ridge that extends away from an inner surface into a flow of the solids. The at least one ridge may spiral along the inner surface of the rotatable sleeve. In certain embodiments, the rotatable sleeve includes multiple ridges. The design of the ridges is dependent on the type of solids processed by the solid feed pump. The ridges may vary in length, width, height, and/or angle or pitch. Alternatively, the ridges may include the same length, width, height, and/or angle or pitch. The inner surface of the rotatable sleeve disposed in the solid feed inlet may converge in a direction of flow of the solids into the solid feed inlet, while the inner surface of the rotatable sleeve disposed in the solid feed outlet may diverge in a direction of flow of the solids out of the solid feed outlet. An outer surface of the rotatable sleeve may include gear teeth (e.g., sleeve gear teeth) and the solid feed pump may include an actuating mechanism (e.g., drive shaft with worm gear teeth, drive motor, etc.) to rotate the rotatable sleeve via the gear teeth. In certain embodiments, the actuating mechanism may include a sensor to determine an amount of torque suitable to rotate the rotatable sleeve as well as a controller to adjust a speed of rotation of the rotatable sleeve based on input from the sensor. In other embodiments, the actuating mechanism and controller may be capable of temporarily reversing the direction of rotation of the sleeve for a period of time sufficient to eliminate a jam or plug which may have developed in the pump inlet. In still other embodiments, the pump housing may incorporate a sensor that is capable of detecting voids within the solid feed in the pump inlet, and the actuating mechanism and controller may be configured to increase the speed of rotation of the sleeve in order to eliminate the voids. In further embodiments, the solid feed pump includes a vibrator spool piece coupled to an upstream end of the pump inlet, wherein the vibrator spool piece includes a vibrator centrally located within the spool piece that extends into the rotatable sleeve and solid feed inlet to actively conduct solid feed into the solid feed inlet. The ability to control the drawing of solids into and/or out of the solid feed pump with the rotatable sleeve (and vibrator) ensures a reliable, steady flow rate of pressurized solids through the pump for efficient pump operation, while reducing the complexity and costs of the feed system. This reduction in feed system complexity and cost comes from the elimination of downstream equipment that normally would be required to smooth out the varying solids flow rate that may be produced by a solids pump that does not have the features described in this present invention. In particular, the ridges of the rotatable sleeve and the vibrator help breakup solids, fill in voids, and ensure a constant flow of solids in and/or out of the solid feed pump.

FIG. 1 is a schematic cross-sectional view of an embodiment of a solid feed pump 10 (e.g., solid fuel pump) having a rotatable sleeve 12 that rotates to actively draw solid feed or solid feedstock into an inlet (e.g., solid feed inlet) or inlet connection 14 of the pump 10. The rotatable sleeve 12 rotates in a circumferential direction 13 about an axis 15 of the sleeve 12. As illustrated, the rotatable sleeve 12 is disposed in the inlet 14 of the pump 10. In certain embodiments, the rotatable sleeve 12 may be disposed in an outlet (e.g., solid feed outlet) or outlet connection 16 of the pump 10. In some embodiments, both the inlet 14 and the outlet 16 may include rotatable sleeves 12. The rotatable sleeve 12 may be a hollow cylinder that includes an inner surface 18, an outer surface 20, a first opening 22 for receiving solid feed (e.g., from a solid feed bin), and a second opening 24 for discharging solid feed in a solid feed passage 26 (e.g., curved passage) of the solid feed pump 10. In certain embodiments, the inner surface 18 converges (e.g., gradually decreasing diameter 28) in a direction of solid feed flow from the first opening 22 to the second opening 24 (e.g., sleeve 12 disposed in the inlet 14, see FIG. 2). In other embodiments, the inner surface 18 diverges (e.g., gradually increasing diameter 86) in the direction of solid feed flow (e.g., sleeve 12 disposed in the outlet 16, see FIG. 2). In certain embodiments, the diameter 28 could decrease or the diameter 86 (see FIG. 2) could increase in a linear manner (e.g., straight conical surface) or nonlinear manner (e.g., curved conical surface). As illustrated, the rotatable sleeve 12 includes a constant diameter (e.g., inner diameter 28) along a length 30 of the sleeve 12. It should be noted that FIG. 1 is a simplified diagram of the pump 10 and sleeve 12 and that some mechanical details may be omitted for clarity. For example, the sleeve 12 may include rotating bearings near both ends of the sleeve 12 (e.g., near openings 22 and 24) to provide rotational support to the sleeve 12. Additionally, the sleeve 12 may also include rotating seals to block process materials from leaking into the narrow annular gap between the sleeve 12 and its installation well in the inlet 14 of the pump 10.

Additionally, as described in greater detail below, the solid feed pump 10 may include a vibrator spool piece coupled to an upstream end of the pump inlet 14 (see FIG. 5). The vibrator spool piece includes a vibrator centrally located within the vibrator spool piece. The vibrator extends into the rotatable sleeve 12 and the inlet 14 and vibrates to actively conduct solid feed into the inlet 14.

The inner surface 18 of the sleeve 12 includes one or more raised ridges 32 that extend away from the inner surface 18 (i.e., radially inward toward axis 15) into a flow of the solid feedstock. As illustrated, the rotatable sleeve 12 includes a plurality of raised ridges 32. The number of ridges 32 on the inner surface 18 may range from 1 to 200, 1 to 50, 1 to 10, 50 to 100, 100 to 150, 150 to 200, and all subranges therebetween. For example, the number of ridges 32 may be 1, 2, 3, 4, 5, 6, 7, 8, 9, 10, 20, 30, 40, 50, 100, 150, 200, or any other number. As illustrated, each ridge 32 at least partially spirals about the axis 15 and/or extends angularly along the length 30 of the inner surface 18 of the sleeve 12. Additionally, each ridge 32 includes a height 34 (see FIG. 3), a width 36, a length 38, and a pitch or angle 40 of its spiral relative to the axis 15 of the sleeve 12. The length 38 of the ridge 32 may extend along the entire length 30 of the sleeve 12 (as illustrated) or only a portion of the length 30 of the sleeve 12 (see FIG. 2). In certain embodiments, the length 38 of the ridge 32 may extend from approximately 1 to 100 percent, 1 to 50 percent, 50 to 100 percent, 25 to 50 percent, 50 to 75 percent, and all subranges therebetween, of the length 30 of the sleeve 12. For example, the length 38 of the ridge 32 may extend approximately 10, 20, 30, 40, 50, 60, 70, 80, 90, or 100 percent, or any other percent of the length 30 of the sleeve 12. The ridges 32 may be straight or curved. In addition, the ridges 32 may be continuous or segmented along length 30. The angle or pitch 40 of the ridge 32 relative to the axis 15 of the sleeve 12 may range from approximately 0 to 89 degrees, 0 to 45 degrees, 15 to 30 degrees, 45 to 89 degrees, and all subranges therebetween. For example, the angle or pitch 40 of the ridge 32 may be approximately 0, 10, 20, 30, 40, 50, 60, 70, 80, or 89 degrees, or any other angle or pitch. As illustrated, each ridge 32 of the plurality of ridges 32 has the same height 34, width 36, length 38, and angle or pitch 40 relative to one another. In certain embodiments, at least one ridge 32 may vary from another ridge 32 of the plurality of ridges 32 with respect to height 34, width 36, length 38, and/or angle or pitch 40 (see FIG. 2). In some embodiments, the height 34 width 36, and angle or pitch 40 may be constant or variable along each ridge 32. All of these parameters of ridges 32 may impact feed rate, pressure, and/or other parameters.

The raised ridges 32 may be manufactured on the inner surface 18 of the rotatable sleeve 12 via a variety of manufacturing techniques known. For example, one such technique includes direct metal laser sintering. Direct metal sintering enables the manufacturing of complex designs on the inner surface 18 of the rotatable sleeve 12. The ridges may be integral (i.e., one-piece) or separate/removable relative to the sleeve 12. Additionally, in certain embodiments, the rotatable sleeve 12 may be removable from the inlet 14 and/or outlet 16 of the solid feed pump 10. For example, the rotatable sleeve 12 may include an internal flange coupling the sleeve 12 to the inlet 14 and/or outlet 16 that also enables the removal of the sleeve 12. Thus, various sleeves 12 with different designs on the inner surface 18 optimized for different materials or different classes of materials of solid feed may interchanged within the inlet 14 and/or outlet 16 in response to changes in the feed material.

A portion of the outer surface 20 of the sleeve 12 includes gear teeth 42 (e.g., sleeve gear teeth) distributed in the circumferential direction 13 around (e.g., 360 degrees around) the outer surface 20. The gear teeth 42 extend radially outward from the outer surface 20 relative to the axis 15. As described in greater detail below, an actuating mechanism 44 engages the gear teeth 42 to rotate the sleeve 12. The actuating mechanism 44 includes a drive shaft 46, a motor 48 that drives the drive shaft 46, a sensor 50, and a controller 52. In certain embodiments, the well in the pump housing 54 in which the sleeve 12 sits may include a sensor 51 to detect the rotational speed of the sleeve 12. In other embodiments, the well in the pump housing 54 may include a sensor to detect the direction of rotation of the sleeve 12. The drive shaft 46 may include a worm gear drive shaft that includes worm gear teeth that engage the gear teeth 42 of the sleeve 12. As illustrated, both the gear teeth 42 of the sleeve 12 and the drive shaft 46 are located near opening 24 (e.g., outlet end) of the sleeve 12 to enable adequate support within a housing 54 of the pump 10 for the drive shaft 46. As described in greater detail below, a length of the drive shaft 46 extends transversely (i.e., crosswise) to the length 30 of the sleeve 12 about the axis 15. Rotation of the shaft 46 via the motor 48 drives rotation of the sleeve 12. The motor 48 may include the sensor 50. The sensor 50 determines the amount of torque required to rotate the sleeve 12. In certain embodiments, sensors 51 (e.g., disposed in the pump housing 54 near the sleeve 12) may determine the rotational speed or the direction of rotation of the sleeve 12. In certain embodiments, sensors 51 (e.g., disposed in the pump housing 54 near the sleeve 12) may determine if a jam has occurred in the solid feed inlet 12. In certain other embodiments, sensors 51 (e.g. disposed in the pump housing 54 near the inlet of the solid feed passage 26) may detect the presence of voids within the solid feed entering the pump. The motor 48 may also include the controller 52. The controller 52 receives input (e.g., the amount of torque suitable to rotate the sleeve 12) from sensors 50, 51 and adjusts the speed of rotation of the sleeve 12 via the motor 48 based on the input. For example, if too much torque is sensed by the sensor 50, the sleeve 12 may be rotating too fast, which could cause the solids to jam in the inlet 14. In response to a sensor input of too much torque, the controller 52 slows down the speed of the rotation of the sleeve 12 via the motor 48. Conversely, too little torque may be sensed by the sensor 50, and the controller 52 may speed up the rotation of the sleeve 12 via the motor 48. Thus, the controller 52 in response to input from the sensor 50 may minimize or eliminate any mismatch between the rotational speed of the pump 10 that carries solid feed forward against a pressure gradient and the linear speed of incoming solid feed caused by the rotation of the sleeve 12. In some embodiments, a jam may be detected in the solid feed inlet 14 and the controller 52 temporality reverses the direction of rotation of the sleeve 12 via the motor 48. In certain embodiments, with one or more sensors in the sleeve 12, the rotational speed of the sleeve 12 may be detected and used as input to the controller 52 to adjust the torque of the motor 48. In other embodiments, with a void sensor 51 incorporated into the pump housing 54 near the solid feed passage inlet 26, the presence of voids may be detected, and the rotational speed of the sleeve 12 may be increased in order to eliminate the voids in the solid feed and to ensure that the pump inlet 14 is reliably supplied with void-free solid feed.

As to the solid feed pump 10, the pump 10 may be a Posimetric Feeder made by General Electric Company of Schenectady, New York. The term "Posimetric" is a trademark of General Electric Company and/or its affiliates, and it refers to the ability of the pump 10 to positively displace (e.g. force displacement of) solids against a pressure gradient at the same time that it accurately meters (e.g. measure an amount of) and controls the flow rate of the solids. The pump 10 is able to meter and positively displace a defined volume of a substance, such as a solid fuel feedstock (e.g., a carbonaceous feedstock). In particular, the solid feed pump 10 is configured to transport a solid feedstock. The pump path may have a circular, or curved, shape. The pump 10 may be used in any suitable application such as an integrated gasification combined cycle (IGCC) system, a gasification system, a solid fuel transport system, or any combination thereof Other suitable applications include production of chemicals, fertilizers, substitute natural gas, transportation fuels, or hydrogen. The pump 10 may deliver solid fuel to a gasifier, boiler, combustor, and/or reactor. In fact, the pump 10 may be used in any application in which solids must be transported against a pressure gradient.

As shown in FIG. 1, the solid feed pump 10 includes a housing 54, inlet 14 (e.g., solid feed inlet), outlet 16 (e.g., solid feed outlet), and rotor 17. In certain embodiments, locations of the inlet 14 and the outlet 16 of the pump 10 may vary. The rotor 17 may include two substantially opposed and parallel rotary discs, not shown, coupled to a hub 19. The rotary discs are not shown as they are both out of the plane of the figure, one being above the plane of the figure and the other being below the plane of the figure. The two rotary discs and the hub 19, which may be connected together via suitable fasteners or which may be machined from a single piece of material, may be movable relative to the housing 54 in a rotational direction 56 from the inlet 14 towards the outlet 16 about a rotational axis 58. The inlet 14 and the outlet 16 may be coupled to the solid feed passage 26, which is a curved, circular, or annular passage formed by the inner, parallel surfaces of the two discs, the outer, convex surface of the hub 19 and the inner, concave surface 57 of the pump housing 54. In certain embodiments, the pump 10 includes more than one passage 26 (e.g., 2-10 passages), with the plurality of passages 26 being disposed about the common axis of rotation 58 and being separated by a plurality of rotating discs connected to the common hub 19. As illustrated in FIG. 1, the passage 26 is disposed between two rotary discs, not shown, and within the housing 54. A solid feed guide 60 (e.g., abutment) may be disposed adjacent the outlet 16. The solid feed guide 60 may extend across the passage 26 between the rotary discs. The rotary discs and the solid feed guide 60 interact to form sliding interfaces (not shown) as the discs rotate in the rotational direction 56. The hub 19 of the rotor 17 and the solid feed guide 60 interact to form a sliding interface 62 as the hub 19 rotates in the rotational direction 56. In particular, the hub 19 is configured to move along the sliding interface 62 with the solid feed guide 60.

As particulate matter (i.e., solid feed) is fed through an opening 63 of the inlet 14, the solid feed pump 10 may impart a tangential force or thrust to the particulate matter (e.g., solid fuel feedstock) in the rotational direction 56 of the rotor 18. The particulate matter is transported in direction 64 from the inlet 14 to the outlet 16. In addition, the particulate matter moves from low to high pressure before being discharged from the outlet 16 of the pump 10. During transport through the pump 10, the particulate matter locks-up in a lock-up region 66, increases in pressure, and exits the pump 10 at a generally constant rate. As the particulate matter rotates through the passage 26, the particulate matter encounters a guide wall 68 of the solid feed guide 60 disposed adjacent the outlet 16 extending across the passage 26. The particulate matter is diverted by the solid feed guide 60 through an opening 70 of the outlet 16, e.g., into an exit pipe connected to a high pressure vessel or into a conveyance pipe line. The pipe may deliver the particulate matter (e.g., solid fuel feedstock) to a gasifier, which then converts the feedstock into a synthesis gas or syngas.

As solid feed (e.g., provided from a solid feed bin) approaches the inlet 14 of the solid feed pump 10, the actuating mechanism 44 drives the rotation of the sleeve 12. The rotation of the sleeve 12 in the circumferential direction 13 about its axis 15 enables the raised ridges 32 to draw the solid feed into the inlet 14 and then the passage 26. The ridges 32 may help to breakup solids, reduce voids, mix up, and generally create a more consistent size and distribution of solids entering inlet 14. Also, the ridges 32 may help drive solids in to ensure a desired feed rate coming in to the pump 10. As mentioned above, components of the actuating mechanism 44 (e.g., motor 48, sensor 50, and controller 52) may control the rotational speed of the sleeve 12. The ability to control the drawing of solid feed into the solid feed pump 10 with the rotatable sleeve 12 ensures a reliable, steady flow rate of pressurized solids through the pump 10 for efficient pump operation, while reducing the complexity and costs of the feed system by eliminating unneeded downstream flow smoothing equipment.

Figure 2:
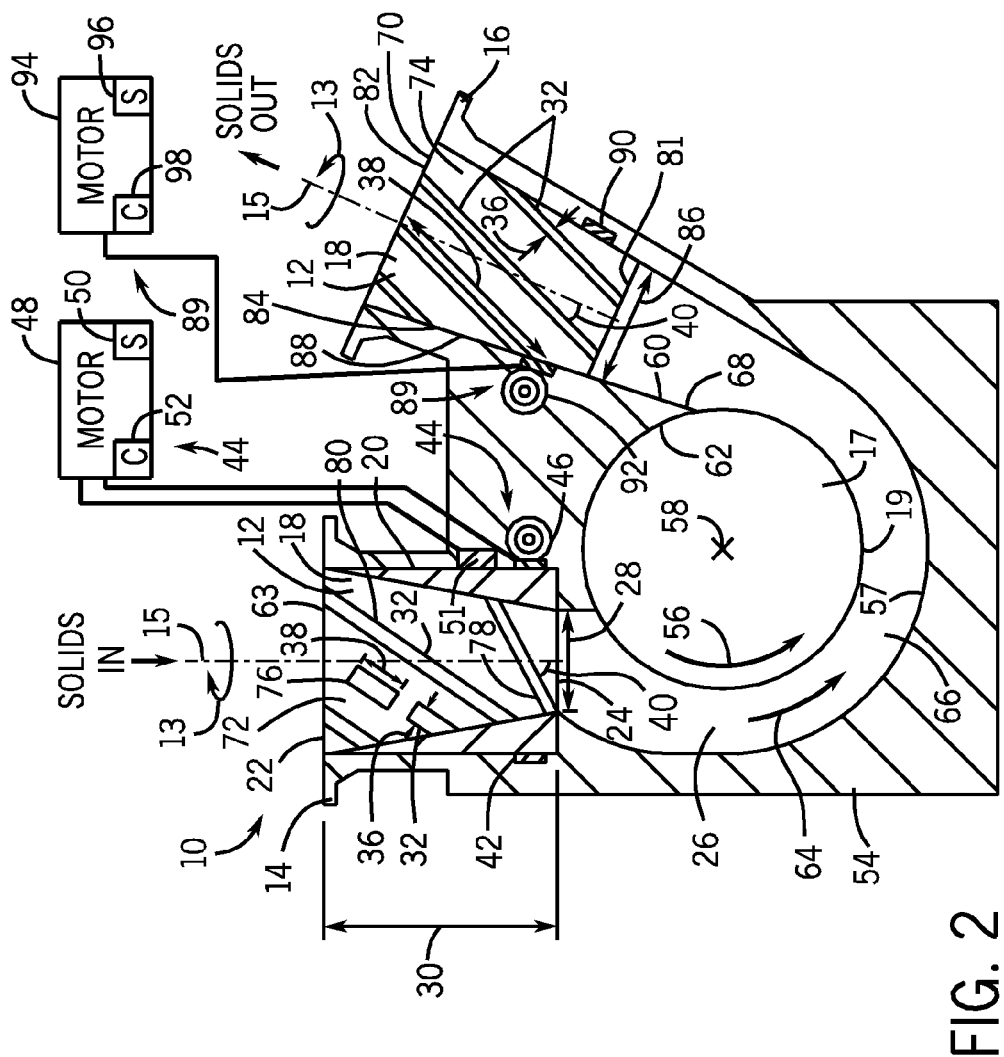
FIG. 2 is a schematic cross-sectional view of an embodiment of a solid feed pump having rotatable sleeves disposed within both a solid feed inlet and a solid feed outlet.

As mentioned above, in certain embodiments, the solid feed pump 10 may include the rotatable sleeve 12 disposed in the outlet 16. FIG. 2 is a schematic cross-sectional view of an embodiment of the solid feed pump 10 (e.g., solid fuel pump) having rotatable sleeves 12 (i.e., rotatable sleeves 72, 74) disposed in both the inlet 14 and outlet 16. It should be noted, embodiments of the solid feed pump 10 may include the sleeve 12 in the inlet 14, outlet 16, or both. In general, the solid feed pump 10 and the rotatable sleeves 12 are as described in FIG. 1 with a few exceptions. In particular, the inner surface 18 of the sleeve 72 converges in a direction of solid feed flow from the first opening 22 to the second opening 24. Thus, the inner diameter 28 of the inner surface 18 of the sleeve 72 gradually narrows (e.g., in a liner or nonlinear manner) from the first opening 22 to the second opening 24. The inner surface 18 may form a straight conical surface or curved conical surface. In addition, the raised ridges 32 on the inner surface 18 of the sleeve 72 vary between each other with respect to height 34, width 36, length 38, and/or angle or pitch 40 of its spiral relative to the axis 15 of the sleeve 12. For example, the width 36 of ridge 76 differs from the width 36 of ridge 78, the length 38 of ridge 76 differs from the length 38 of both ridges 78 and 80, and the pitch or angle 40 of ridge 78 differs from the pitch or angle 40 of ridge 80. As mentioned above, the length 38 of the ridge 32 may extend along the entire length 30 of the sleeve 12 or only a portion of the length 30 of the sleeve 12 (e.g., ridge 76). In certain embodiments, the length 38 of the ridge 32 may extend from approximately 1 to 100 percent, 1 to 50 percent, 50 to 100 percent, 25 to 50 percent, 50 to 75 percent, and all subranges therebetween, of the length 30 of the sleeve 12. For example, the length 38 of the ridge 32 may extend approximately 10, 20, 30, 40, 50, 60, 70, 80, 90, or 100 percent, or any other percent, of the length 30 of the sleeve 12. The angle or pitch 40 of the ridge 32 relative to the axis 15 of the sleeve 12 may range from approximately 0 to 89 degrees, 0 to 45 degrees, 15 to 30 degrees, 45 to 89 degrees, and all subranges therebetween. For example, the angle or pitch 40 of the ridge 32 may be approximately 0, 10, 20, 30, 40, 50, 60, 70, 80, or 89 degrees, or any other angle or pitch.

The sleeve 74 disposed in the outlet 16 includes a first opening 81 for receiving solid feed from the curved passage 26 and a second opening 82 for discharging solid feed out of the solid feed pump 10. The rotatable sleeve 74 rotates to actively draw solid feed out of the outlet 16 via the ridges 32. In contrast to the sleeve 72, an inner surface 84 of sleeve 74 diverges in a direction of solid feed flow from the first opening 81 to the second opening 82. In particular, a diameter 86 (i.e., inner diameter) of the inner surface 84 increases (e.g., in a linear or nonlinear manner) from the first opening 81 to the second opening 82. The inner surface 84 may form a straight conical surface or curved conical surface. As illustrated, each ridge 32 of the plurality of ridges 32 of sleeve 74 has the same height 34, width 36, length 38, and angle or pitch 40 relative one another. In certain embodiments, at least one ridge 32 of sleeve 74 may vary from another ridge 32 of the plurality of ridges 32 with respect to height 34, width 36, length 38, and/or angle or pitch 40.

Each sleeve 12 is coupled to its own actuating mechanism 44, 89. The actuating mechanism 44 for sleeve 72 is as described in FIG. 1. Similar to sleeve 72, sleeve 74 includes a portion of an outer surface 88 that includes gear teeth 90 (e.g., sleeve gear teeth) distributed in the circumferential direction 13 around (e.g., 360 degrees around) the outer surface 88 relative the axis 15. The gear teeth 90 extend radially outward from the outer surface 88. The actuating mechanism 89 engages the gear teeth 90 to rotate the sleeve 74. The actuating mechanism 89 includes a drive shaft 92, a motor 94 that drives the drive shaft 92, a sensor 96, and a controller 98. The components of the actuating mechanism 89 for sleeve 74 are similar to the components of the actuating mechanism 44 for sleeve 72 as described above in FIG. 1. As illustrated, each motor 48, 94 includes a single controller 52, 98. However, in certain embodiments, the motors 48, 94 may share a common controller to control the rotational speed of both sleeves 72, 74. The ability to control the drawing of solid feed into the solid feed pump 10 via sleeve 72 and/or drawing solid feed out of the solid feed pump 10 via sleeve 74 ensures a reliable, steady flow rate of pressurized solids through the pump 10 for efficient pump operation, while reducing the complexity and costs of the feed system by eliminating unneeded downstream flow smoothing equipment.

Figure 4:
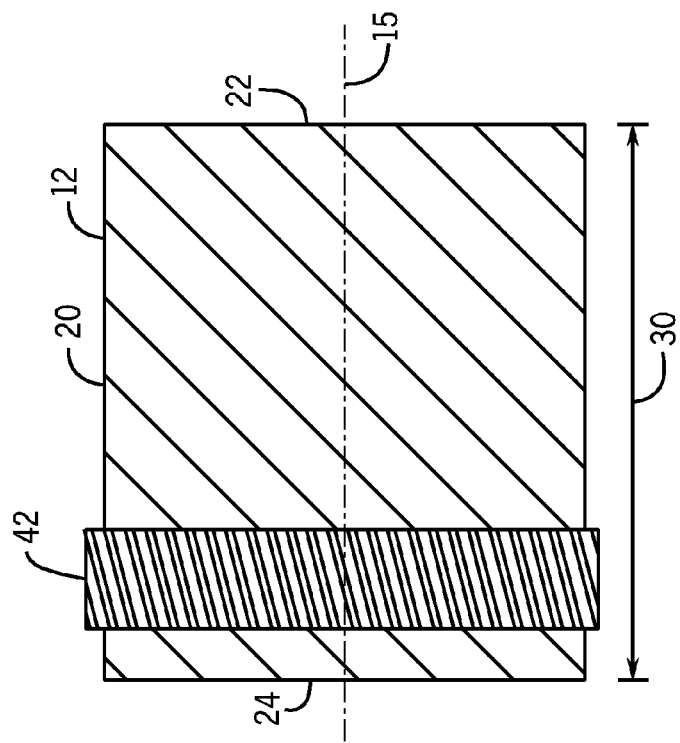
FIG. 4 is a schematic side view of the rotatable sleeve of FIGS. 1 and 2.
Figure 3:
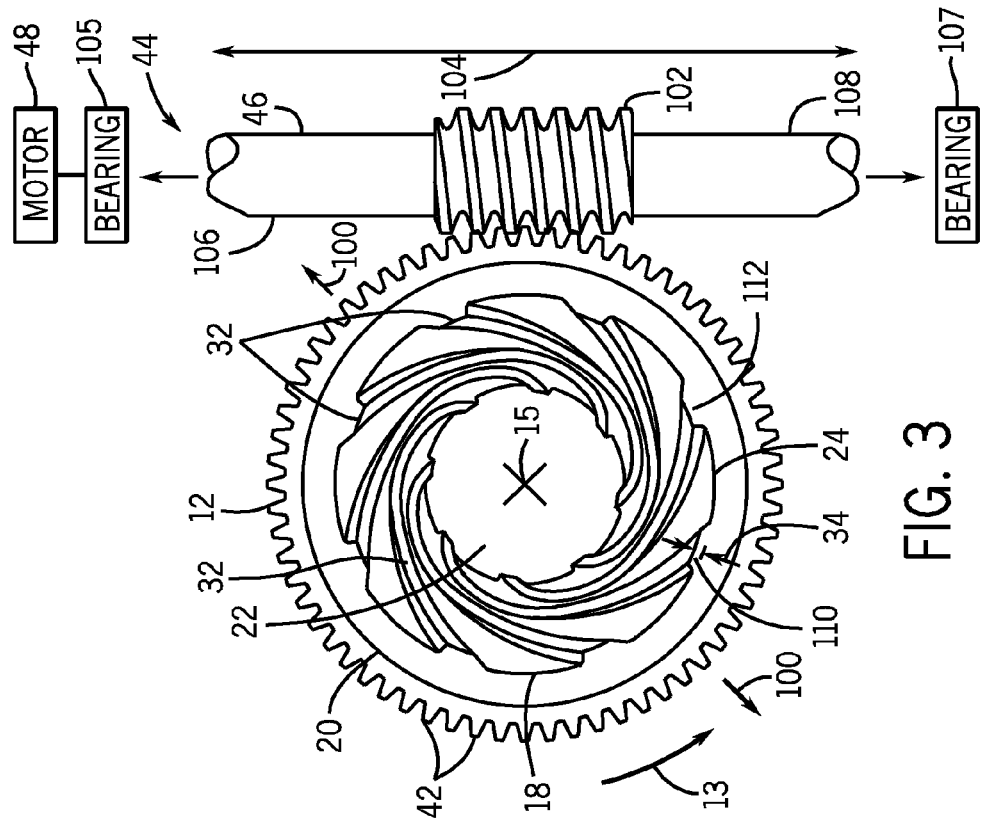
FIG. 3 is a schematic bottom view of the rotatable sleeve of FIGS. 1 and 2.

FIGS. 3 and 4 are schematic bottom and side views, respectively, of the rotatable sleeve 12 of FIGS. 1 and 2. The rotatable sleeve 12 is as described above. In particular, the sleeve 12 may be a hollow cylinder that includes the inner surface 18, the outer surface 20, the first opening 22 for receiving solid feed (e.g., from a solid feed bin), and the second opening 24 for discharging solid feed into the solid feed passage 26 (e.g., curved passage) of the solid feed pump 10. Although the following discussion describes the sleeve 12 as disposed in the inlet 14, the following discussion also applies to sleeves 12 disposed in outlets 16 except that opening 22 is for receiving solid feed from the passage 26 and opening 24 is for discharging solid feed out of the solid feed pump 10. In the case of the outlet sleeve, the outer surface 20 includes the gear teeth 42 (e.g., sleeve gear teeth) on a portion of the sleeve 12 near the opening 22. As illustrated for the case of the inlet sleeve, the gear teeth 42 of the sleeve 12 and the drive shaft 46 are located near opening 24 of the sleeve 12 to enable adequate support within the housing 54 of the pump 10 for the drive shaft 46. The gear teeth 42 are distributed in the circumferential direction 13 around (e.g., 360 degrees around) the outer surface 20 and the axis 15 of the sleeve 12. Also, the gear teeth 42 extend radially outward from the outer surface 20 as indicated by arrows 100. The number of gear teeth 42 on the outer surface 20 may range from 5 to 200, 10 to 50, 50 to 100, 100 to 150, 150 to 200, and all subranges therebetween. For example, the number of gear teeth 42 may be 10, 20, 30, 40, 50, 100, 150, 200, or any other number. As described in greater detail below, the actuating mechanism 44 engages the gear teeth 42 to rotate the sleeve 12.

As mentioned above, the actuating mechanism 44 includes the drive shaft 46 and the motor 48 that drives the drive shaft 46. As illustrated, the drive shaft 46 may include a worm gear drive shaft that includes worm gear teeth 102 that engage the gear teeth 42 of the sleeve 12. The number of worm gear teeth 102 on the drive shaft 46 may range from 2 to 100, 5 to 50, 10 to 25, 50 to 100, 75 to 100, and all subranges therebetween. For example, the number of worm gear teeth 102 may be 10, 20, 30, 40, 50, 60, 70, 80, 90, or 100, or any other number. A length 104 of the drive shaft 46 extends transversely (i.e., crosswise) to the length 30 of the sleeve 12 (see FIGS. 1 and 2). The drive shaft 46 includes ends 106 and 108. The end 106 couples to a support bearing 105 (e.g., proximal support bearing) and motor drive of the motor 48, while the end 108 couples to a support bearing 107 (e.g., distal support bearing). Rotation of the shaft 46 via the motor 48 drives rotation of the sleeve 12 via the interaction of the worm gear teeth 102 and sleeve gear teeth 42 to enable the raised ridges 32 to draw solid feed into and/or out of the solid feed pump 10.

As illustrated, the inner surface 18 of the rotatable sleeve 12 includes the plurality of ridges 32, all of which have the same geometry. However, in some embodiments, at least one ridge 32 varies from the other ridges 32 with respect to height 34, width 36, length 38, angle or pitch 40. For example, the height 34 of ridge 110 may differ from the height 34 of ridge 112. The height 34 of each ridge 32 may be approximately 1 to 50, 2 to 25, or 3 to 10 percent of the diameter 28. Also, as illustrated, the ridges 32 at least partially spiral and/or extend angularly along the length 30 of the rotatable sleeve 12. The ridges 32 may help to breakup solids, reduce voids, mix up, and generally create a more consistent size and distribution of solids entering inlet 14. Also, the ridges 32 may help drive solids into the inlet to ensure a desired feed rate coming into the pump 10. The ability to control the drawing of solid feed into and/or out of the solid feed pump 10 via rotatable sleeves 12 ensures a reliable, steady flow rate of pressurized solids through the pump 10 for efficient pump operation, while reducing the complexity and costs of the feed system by eliminating unneeded downstream flow smoothing equipment.

Figure 5:
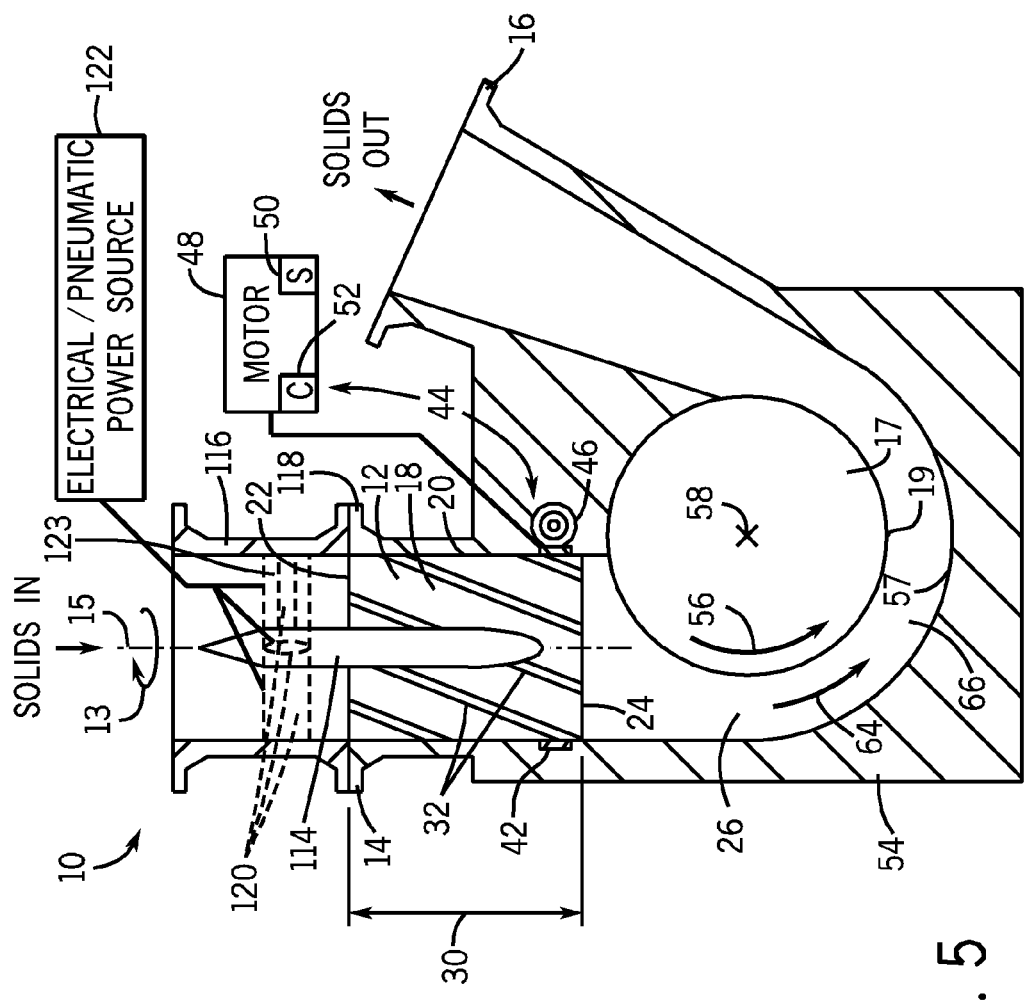
FIG. 5 is a schematic cross-sectional view of an embodiment of a solid feed pump having a rotatable sleeve and a vibrator disposed within a solid feed inlet.

FIG. 5 is a schematic cross-sectional view of an embodiment of the solid feed pump 10 having the rotatable sleeve 12 and a vibrator 114 (e.g., pencil-type vibrator) disposed within the solid feed inlet 14. The solid feed pump 10 and rotatable sleeve 12 are as described above in FIG. 1. In addition, the solid feed pump 10 includes a vibrator spool piece 116 coupled to an upstream end 118 of the pump inlet 14. The vibrator spool piece 116 includes the vibrator 114 centrally located within the vibrator spool piece 116. The vibrator spool piece 116 supports the vibrator 114 via three supports 120 spaced approximately 120 degrees apart. In certain embodiments, the number of supports 120 may range from 1 to 10, 1 to 5, 1 to 3, 3 to 5, and all subranges therebetween. For example, the number of supports 120 may be 1, 2, 3, 4, 5, 6, 7, 8, 9, or 10, or any other number. The vibrator 114 extends into the rotatable sleeve 12 and the inlet 14 and vibrates to actively conduct solid feed into the inlet 14. In particular, the vibrator 114 extends axially into the opening 22 of the sleeve 12 in the direction of solid feed flow. The vibrator 114 may extend into the opening 22 along the entire length 30 of the sleeve 12 or only a portion of the length 30 of the sleeve 12. In certain embodiments, the vibrator 114 may extend into the opening 22 from approximately 1 to 100 percent, 1 to 50 percent, 50 to 100 percent, 25 to 50 percent, 50 to 75 percent, and all subranges therebetween, of the length 30 of the sleeve 12. For example, the vibrator 114 may extend into the opening 22 approximately 10, 20, 30, 40, 50, 60, 70, 80, 90, or 100 percent, or any other percent of the length 30 of the sleeve 12. The movement of the vibrator 114 (e.g., pencil-type vibrator) eliminates or prevents gas-filled void spaces that may form within the solid feed from the solid feed bin to the inlet 14. The vibrator 114 and its supports 120 include aerodynamically- or hydrodynamically-smoothed shapes (e.g., air foil shapes) to promote movement of particulate solids around and past them. The vibrator 114 is powered by a power source 122 external to the spool piece 116. The power source 112 may provide electrical or pneumatic power. The electrical or pneumatic power is conducted to the vibrator 114 through a channel 123 in one of the supports 120. The ridges 32 and vibrator 114 both help to mix, breakup, and uniformly distribute the solids, while also reducing voids. The ability to control the drawing of solids into and/or out of the solid feed pump 10 with the rotatable sleeve 12 and the vibrator 114 ensures a reliable, steady flow rate of pressurized solids through the pump 10 for efficient pump operation, while reducing the complexity and costs of the feed system by eliminating unneeded downstream flow smoothing equipment.

Technical effects of the disclosed embodiments include systems for maintaining a desired pressure level and flow rate of solids into and/or out of a solid feed pump 10. In particular, the solid feed pump 10 includes the rotatable sleeve 12 that rotates to actively draw solid feed into the solid feed inlet 14 and/or out of the solid feed outlet 16 of the pump 10. The rotatable sleeve 12 includes ridges 32 to draw the solid feed into and/or out of the pump 10. The actuating mechanism 44 rotates the sleeve 12 as well as controls the rotational speed and rotational direction of the sleeve 12. In certain embodiments, the solid feed pump 10 may include the vibrator spool piece 116 that includes the vibrator 114 coupled to the upstream end 118 of the pump inlet 14, where the vibrator 114 extends into the opening 22 of the sleeve 12 to actively conduct solid feed into the solid feed inlet 14. The ability to control the drawing of solid feed into and/or out of the solid feed pump 10 via the rotatable sleeves 12 ensures a reliable, steady flow rate of pressurized solids through the pump 10 for efficient pump operation, while reducing the complexity and costs of the feed system by eliminating unneeded downstream flow smoothing equipment.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a solid feed pump, comprising:
a housing;
a rotor disposed in the housing;
a curved passage disposed between the rotor and the housing;
a solid feed inlet coupled to the curved passage;
a solid feed outlet coupled to the curved passage;
a rotatable sleeve disposed within the solid feed inlet and configured to rotate to actively draw solid feed into the solid feed inlet, wherein the rotatable sleeve comprises a first opening for receiving solid feed and a second opening for discharging solid feed into the curved passage; and
a vibrator spool piece coupled to an upstream end of the solid feed inlet, wherein the vibrator spool piece comprises a vibrator centrally located within the vibrator spool piece, the vibrator extends into the first opening of the rotatable sleeve in a direction of solid feed flow from the first opening to the second opening, and the vibrator is configured to actively conduct solid feed into the solid feed inlet.

2. The system of claim 1, wherein the rotatable sleeve comprises an inner surface, wherein the inner surface converges in a direction of solid feed flow from the first opening to the second opening.

3. The system of claim 1, wherein the rotatable sleeve comprises a hollow cylinder, an inner surface, and at least one ridge that extends away from the inner surface into a flow of the solid feed.

4. The system of claim 3, wherein the rotatable sleeve comprises a plurality of ridges, wherein at least one ridge varies from another ridge of the plurality of ridges with respect to length, width, height, or pitch.

5. The system of claim 3, wherein the rotatable sleeve comprises a plurality of ridges, and each ridge of the plurality of ridges has a same length, width, height, and pitch.

6. The system of claim 3, wherein the at least one ridge spirals along the inner surface of the rotatable sleeve.

7. The system of claim 1, wherein the rotatable sleeve comprises an outer surface and a portion of the outer surface comprises sleeve gear teeth, wherein the solid feed pump comprises an actuating mechanism configured to rotate the rotatable sleeve via the sleeve gear teeth.

8. The system of claim 7, wherein the actuating mechanism comprises a drive shaft having worm gear teeth configured to engage the sleeve gear teeth of the rotatable sleeve, and a drive motor coupled to the drive shaft and configured to rotate the drive shaft.

9. The system of claim 8, wherein the actuating mechanism comprises a sensor configured to determine an amount of torque required to rotate the rotatable sleeve, and a controller configured to adjust a speed of rotation of the rotatable sleeve based on input from the sensor.

10. The system of claim 8, wherein the actuating mechanism comprises a sensor configured to determine if a jam has occurred in the solid feed inlet and wherein the actuating mechanism is configured to temporarily reverse a direction of rotation of the rotating sleeve in order to alleviate the jam in the solid feed inlet.

11. The system of claim 8, wherein the actuating mechanism comprises a sensor configured to detect voids in the solid feed entering the solid feed pump, and wherein the actuating mechanism is configured to adjust a speed of rotation of the rotatable sleeve based on input from the sensor.

12. A system, comprising:
a rotatable sleeve configured to be disposed in its entirety within a solid feed outlet of a solid feed pump and to rotate to actively draw solid feed out of the solid feed outlet, wherein the rotatable sleeve comprises a hollow cylinder, an inner surface, and at least one spiral ridge that extends away from the inner surface into a flow of the solid feed.

13. The system of claim 12, wherein the rotatable sleeve comprises a plurality of ridges, wherein at least one ridge varies from another ridge of the plurality of ridges with respect to length, width, height, or pitch.

14. The system of claim 12, wherein the rotatable sleeve comprises a plurality of ridges, and each ridge of the plurality of ridges has a same length, width, height, and pitch.

15. The system of claim 12, comprising a solid feed pump having the rotatable sleeve.

16. A system, comprising:
a rotatable sleeve configured to be disposed within a solid feed inlet of a solid feed pump, wherein the rotatable sleeve is configured to rotate to actively draw solid feed into the solid feed inlet; and
a vibrator spool piece configured to be coupled to an upstream end of the solid feed inlet, wherein the vibrator spool piece comprises a vibrator centrally located within the vibrator spool piece, the vibrator being configured to extend into an opening of the rotatable sleeve in a direction of solid feed flow, and the vibrator is configured to actively conduct the solid feed into the solid feed inlet, wherein the rotatable sleeve comprises an inner surface, a first opening for receiving solid feed, and a second opening for discharging solid feed into a curved passage, wherein the inner surface converges in a direction of solid feed flow from the first opening to the second opening.

17. The system of claim 16, wherein the rotatable sleeve comprises a hollow cylinder, an inner surface, and at least one ridge that extends away from the inner surface into a flow of the solid feed.

18. The system of claim 16, wherein the rotatable sleeve comprises an outer surface and a portion of the outer surface comprises sleeve gear teeth, wherein the solid feed pump comprises an actuating mechanism configured to rotate the rotatable sleeve via the sleeve gear teeth.

* * * * *